(12) United States Patent
Kishigami et al.

(10) Patent No.: US 7,447,130 B2
(45) Date of Patent: Nov. 4, 2008

(54) OPTICAL DISC, OPTICAL DISC DEVICE, OPTICAL DISC RECORDING DEVICE, AND OPTICAL DISC DRIVING METHOD

(75) Inventors: Tomo Kishigami, Tokyo (JP); Yoshihiro Kiyose, Tokyo (JP); Nobuo Takeshita, Tokyo (JP); Toru Yoshihara, Tokyo (JP); Masaharu Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 390 days.

(21) Appl. No.: 10/574,510

(22) PCT Filed: May 26, 2005

(86) PCT No.: PCT/JP2005/009619

§ 371 (c)(1),
(2), (4) Date: Apr. 3, 2006

(87) PCT Pub. No.: WO2006/001152

PCT Pub. Date: Jan. 5, 2006

(65) Prior Publication Data

US 2007/0025210 A1    Feb. 1, 2007

(30) Foreign Application Priority Data

Jun. 25, 2004    (JP) .............................. 2004-188952

(51) Int. Cl.
*G11B 7/00*    (2006.01)

(52) U.S. Cl. .................. 369/47.53; 369/275.3

(58) Field of Classification Search .............. 369/47.53, 369/275.3
See application file for complete search history.

(56) References Cited

U.S. PATENT DOCUMENTS

| 2003/0185121 A1 | 10/2003 | Narumi et al. | |
|---|---|---|---|
| 2005/0213481 A1* | 9/2005 | Ando et al. | 369/275.3 |
| 2007/0097846 A1* | 5/2007 | Ando et al. | 369/275.3 |

FOREIGN PATENT DOCUMENTS

| CN | 1232262 | 10/1999 |
|---|---|---|
| CN | 1447968 | 10/2003 |
| JP | 2000-311346 A | 11/2000 |
| WO | WO-02/23542 A1 | 3/2002 |

* cited by examiner

*Primary Examiner*—Wayne Young
*Assistant Examiner*—Van T Pham
(74) *Attorney, Agent, or Firm*—Birch, Stewart, Kolasch & Birch, LLP

(57) ABSTRACT

An optical disc on which information can be recorded by recording light has a first recording layer (102) and a second recording layer (103) disposed behind the first recording layer as viewed by the recording light; the first recording layer and the second recording layer have respective power adjustment areas (P1, P2) that are used to adjust the power of the recording light to the optimal recording power at the time of recording of information on each recording layer; a prewrite area (PW) is provided in correspondence to the power adjustment area (P2) used for optimal power adjustment in the second recording layer and restricted areas (A1, A2) on both sides of that power adjustment area (P2). The restricted areas (A1, A2) allow for the diameter of the recording light beam and for lamination misalignment. This configuration enables stable test recording to be carried out in a short time on an optical disc having multiple recording layers.

3 Claims, 8 Drawing Sheets

OPTICAL DISC, OPTICAL DISC DEVICE, OPTICAL DISC RECORDING DEVICE, AND OPTICAL DISC DRIVING METHOD

FIELD OF THE INVENTION

The present invention relates to an optical disc with a plurality of recording layers each of which has a test recording area for use in setting the optimal recording power, and to an optical disc device for driving the optical disc, an optical disc driving method, and an optical disc recording method.

BACKGROUND ART

In order to record under optimal recording conditions, optical discs having recording functions are provided with test recording areas. When an optical disc has a plurality of recording layers and the layer being recorded on is a lower layer, as viewed from the side on which the recording light is incident, the optimal conditions differ depending on whether the layer or layers above are in a recorded state or not, so it is necessary to know the state of the upper layer or layers.

A known strategy is to check the recording state of the layer(s) above the layer onto which information will be recorded and make a test recording under the same conditions (refer to Patent Document 1, for example).

Patent Document 1: Japanese Patent Application Publication No. 2000-311346 (pp. 1 to 15, FIGS. 1 to 8)

DISCLOSURE OF THE INVENTION

Problems to be Solved by the Invention

A problem with an optical disc having a plurality of recording layers is that when a recording is made on a lower layer, as viewed from the side of incidence of the recording light, the start is delayed because the recording of information cannot start until the state of the upper recording layer(s) has been ascertained.

This invention addresses the above problem with the object of enabling stable information recording to start in a short time.

Means of Solution of the Problems

This invention provides an optical disc having at least two layers on which information can be recorded by recording light, one layer being a first recording layer, another layer being a second recording layer disposed behind the first recording layer as viewed by the recording light, wherein the first recording layer and the second recording layer have respective power adjustment areas that are used to adjust the power of the recording light to an optimal recording power before recording information on each recording layer, and the first recording layer has, as a prewrite area in a position corresponding to the power adjustment area in the second layer, an area equal to the power adjustment area in the second recording layer plus a restricted area adjacent the power adjustment area in the second recording layer, no information being recorded in the restricted area of the second recording layer until recording in the corresponding area in the first recording layer is completed.

Effect of the Invention

The present invention makes it possible to secure a test recording area in each recording layer, and accordingly to set stable recording conditions.

Figure 1:
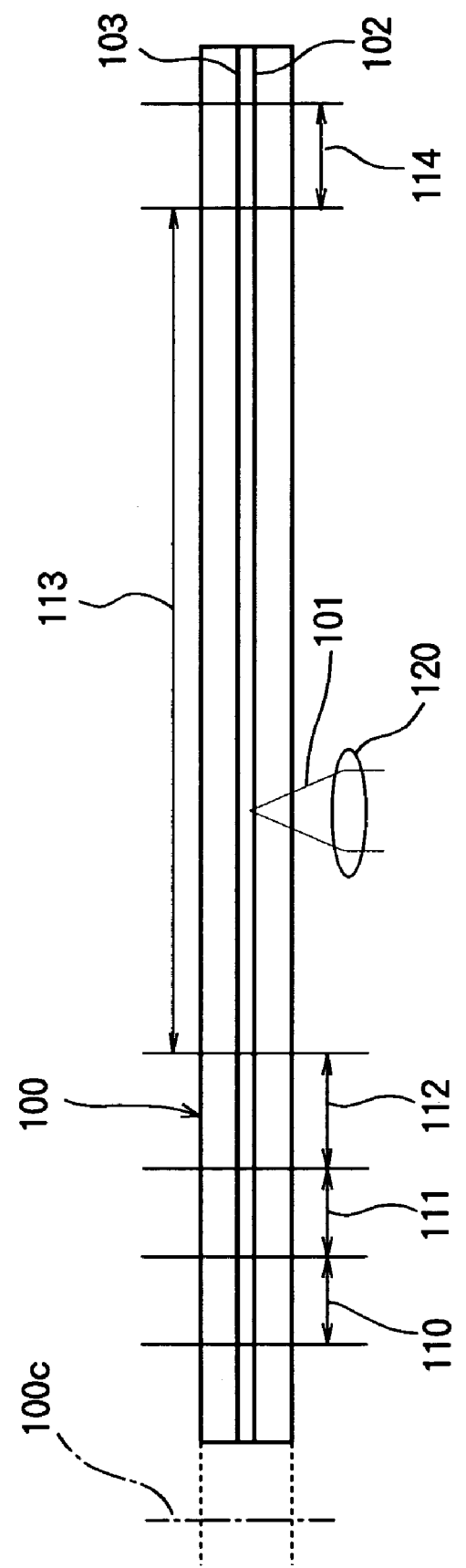
FIG. 1 shows an optical disc used in embodiments of the invention.

EXPLANATION OF REFERENCE CHARACTERS 100, 206 optical disc, 101 beam, 102 first recording layer, 103 second recording layer, 110 power adjustment area, 111 recording management area, 112 compatibility area, 113 data recording area, 114 compatibility area, 120 objective lens of optical pickup, 202 formatter, 203 pulse strategy generating circuit, 204 laser driving circuit, 205 optical head, 207 preamplifier circuit, 208 servo circuit, 209 OPC (optical power control) computational circuit, 210 buffer memory

BEST MODE OF PRACTICING THE INVENTION

First Embodiment

FIG. 1 is a drawing showing a writable optical disc having two recording layers on one side according to a first embodiment of the invention. The optical disc 100 in FIG. 1 has a rotational axis 100c, a first recording layer 102, a second recording layer 103, a power adjustment area for adjustment of optimal recording power for recording on the optical disc 100, a recording management area 111 for recording management information and control information about recording, and compatibility areas 112 and 114 for recording information for providing compatibility with read-only discs to enable reproduction on read-only players and the like. Compatibility area 112 also includes a disc management area in which disc management information for the optical disc 100 is recorded. Between the two compatibility areas 112 and 114 there is a data recording area 113 for recording data, in which an optical disc device records desired data. The power adjustment area 110, recording management area 111, compatibility area 112, data recording area 113, and compatibility area 114 are disposed in this order from the inner edge toward the outer edge of the optical disc 100. The drawing also shows the objective lens 120 of an optical pickup and the beam 101 (recording light) focused by the objective lens to enable recording and/or reproducing of information on the optical disc 100.

In FIG. 1, when recording is performed on the second recording layer 103, it may be necessary to record under different conditions depending on whether the first recording layer 102 has been recorded on or not. Therefore the recording state of the first layer has to be checked before recording on the second layer, but this poses a problem in that, because the check takes time, recording cannot start immediately, so when data are recorded, data are first recorded on the first layer and then on the second layer; consequently, when data are recorded on the second layer, the corresponding area in the first layer is always in a recorded state, and recording can be performed under uniform conditions.

In general, before data are recorded on the optical disc 100, the recording power is adjusted by a trial recording. The optical disc 100 has a power adjustment area 110 at its innermost edge, for example, separate from the area in which the data are recorded, for adjusting the recording power. The recording power is adjusted for each recording layer; power is adjusted in the power adjustment area 110 in the same layer as the layer in which the data will be recorded. When recording power is adjusted for the second layer, in order to match the conditions under which data will be recorded in the data area in the second layer, the part of the power adjustment area 110 in the first layer facing the power adjustment area in the second layer must be in a recorded state.

Figure 2:
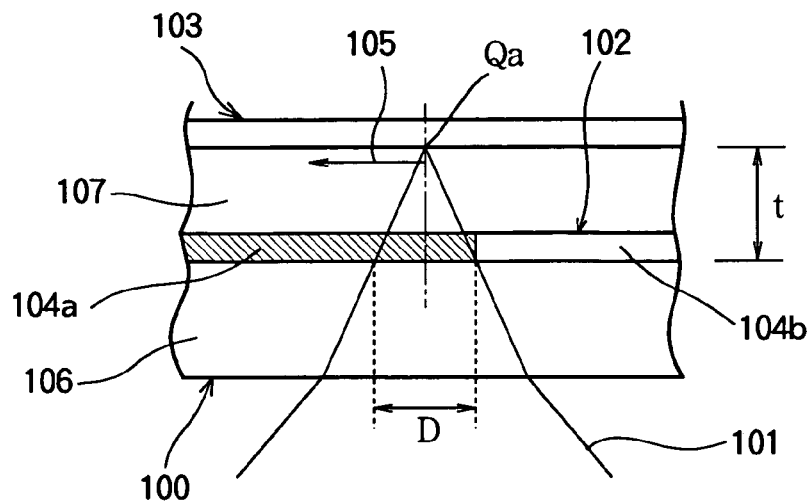
FIG. 2 shows relationships between the beam and the recording layers of the optical disc in the embodiments of the invention.

FIG. 2 shows the structure of the layers in an optical disc in more detail, showing the relationship between the recording layers and the beam. In FIG. 2, 100 denotes the optical disc, 101 denotes the beam incident on the optical disc 100 during recording and reproduction, 102 denotes the first recording layer, 103 denotes the second recording layer, 106 denotes the substrate, and 107 denotes a spacer. 104a denotes the recorded part of the first recording layer 102; 104b denotes the part of the first recording layer 102 on which data have not yet been recorded. Qa is the position from which-recording will start in the second recording layer 103, arrow 105 indicates the direction and extent of the area in which recording will take place starting from position Qa, t is the distance between the first recording layer 102 and second recording layer 103, and D is the diameter of the beam 101 incident on the first recording layer 102 when data is recorded on or reproduced from the second recording layer 103.

When recording is performed on the second recording layer 103, the recording conditions may be affected if, within the diameter D of the beam 101, the state of the first recording layer 102 is not identically the recorded state 104a. Therefore, given that recording will proceed from the starting position Qa over the area indicated by the arrow 105, an area equal to this area plus half the beam diameter D needs to be in a uniformly recorded state in the first recording layer 102.

Figure 3A:
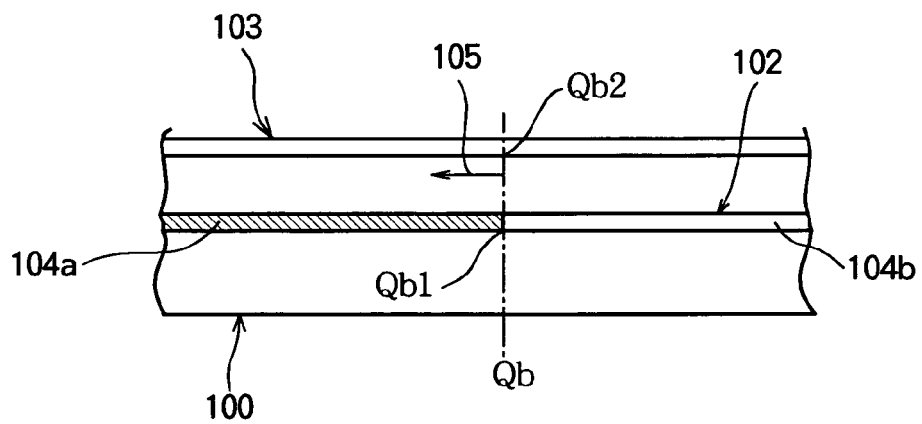
FIGS. 3(a) and 3(b) illustrate misalignment between the first and second layers in the embodiments of the invention.
Figure 3B:
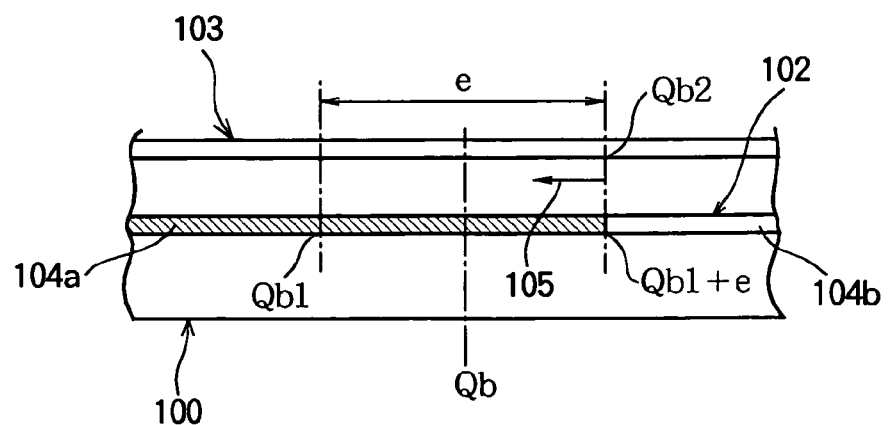

FIGS. 3(a) and 3(b) illustrates misalignment between the first and second layers. FIG. 3(a) shows a case in which the first layer and the second layer were laminated without misalignment, while FIG. 3(b) shows a case in which misalignment occurred (a case of maximum misalignment). In this figure, Qb is the position of a certain address on an ideal disc, Qb1 is the position corresponding to position Qb in the first recording layer 102, Qb2 is the position corresponding to position Qb in the second recording layer 103, and e is the maximum eccentricity of the disc. As shown in FIG. 3(a), when the first recording layer 102 and the second recording layer 103 are laminated without misalignment, position Qb1 on the first layer and position Qb2 on the second layer are aligned properly. When recording is performed from position Qb on the second recording layer 103 in the direction of the arrow 105, the first recording layer 102 must be in a uniformly recorded state 104a in an area starting from the corresponding position Qb1.

As shown in FIG. 3(b), if a misalignment is introduced when the first recording layer 102 and the second recording layer 103 are laminated, position Qb1 on the first layer will be offset from position Qb2 on the second layer by an amount e.

The lamination misalignment is an eccentricity from the center of the optical disc 100, and the maximum value of the misalignment between the first recording layer 102 and the second recording layer 103 is the maximum eccentricity e.

When recording is performed from position Qb2 in the direction of arrow 105 on the second recording layer 103 of an optical disc 100 having lamination misalignment, the first recording layer 102 must be in a uniformly recorded state 104a in an area that makes an allowance for the eccentricity e shown in FIG. 3(b).

Therefore, when recording is performed on the second recording layer 103, the corresponding area in the first recording layer 102 that must always be in a uniformly recorded state includes a margin to allow for the beam effect illustrated in FIG. 2 and the lamination misalignment effect illustrated in FIG. 3(b).

If the area providing this margin is a restricted area A, the width Aw of the restricted area A is Aw=e+D/2, which includes half the diameter D of the beam 101 and the eccentricity e of the optical disc 100 caused by the maximum lamination misalignment.

If the numerical aperture (NA) of the objective lens 120 of the optical pickup is 0.6, for example, and the maximum distance between the first recording layer 102 and second recording layer 103 is 65 µm (55±15 µm), then the diameter D of the beam 101 is 56 µm. If in addition the maximum eccentricity e is 40 µm, then the width Aw of the restricted area (A) is 68 µm.

This embodiment, by providing a restricted area A with a width Aw equal to or greater than e+D/2, arranges that the recorded state of the first layer does not affect recording on the second layer.

Figure 4:
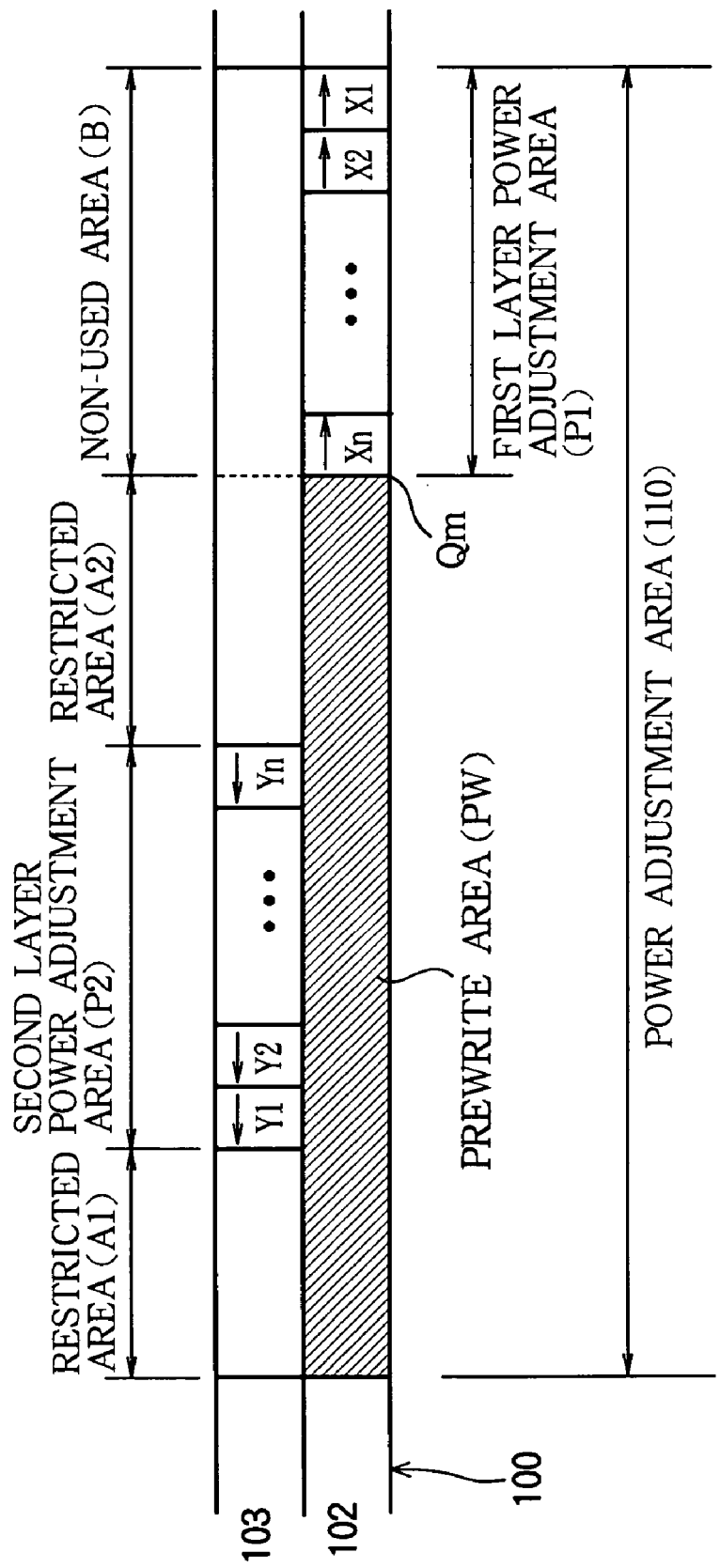
FIG. 4 shows the structure of the power adjustment areas of an optical disc according to a first embodiment.

FIG. 4 shows an example of the detailed structure of the power adjustment area 110 in an optical recording disc according to the first embodiment of the invention.

In FIG. 4, 100 denotes the optical disc, 102 denotes the first recording layer, and 103 denotes the second recording layer. The substrate 106 and spacer 107 shown in FIG. 2 are omitted in FIG. 4, and in FIGS. 5 to 7.

The power adjustment area 110 in the first recording layer 102 comprises a first layer power adjustment area P1 for adjusting the optimal recording power in the first recording layer 102, and a prewrite area PW.

The power adjustment area 110 in the second recording layer 103 comprises a second layer power adjustment area P2, a non-used area B which is not used as a power adjustment area for the second recording layer 103 but occupies the area corresponding to the first layer power adjustment area P1, and restricted areas A1 and A2 which allow for lamination misalignment and beam diameter effects. The restricted areas A1 and A2 are positioned on both sides of the second layer power adjustment area P2 (the inner side and outer side in the radial direction).

The prewrite area PW is an area, equal to the second layer power adjustment area P2 plus the restricted areas A1 and A2, in which the disc manufacturer records data at the optimal recording power prior to product shipment.

As shown in FIG. 4, power adjustments are performed in the first layer power adjustment area P1 in order from the outer toward the inner part of the optical disc 100, i.e., in the order of areas X1, X2, . . . , Xn. In each of these power adjustment areas, trial recording is performed from the inner edge toward the outer edge, as indicated by the arrows in the drawing. In addition, in order to manage the areas used for power adjustment, an area for recording the addresses used is provided in the recording management area 111 of the optical disc 100 (FIG. 1), and address information is recorded in this area, together with the adjusted power value.

As shown in FIG. 4, power adjustments are performed in the second layer power adjustment area P2 in order from the inner part toward the outer part of the optical disc 100, i.e., in the order of areas Y1, Y2, ..., Yn. In each of these power adjustment areas, trial recording is performed from the outer edge toward the inner edge, as indicated by the arrows in the drawing. In addition, in order to manage the areas used for power adjustment, an area for recording the addresses used is provided in the recording management area 111 of the optical disc 100 (FIG. 1), and address information is recorded in this area together with the adjusted power value.

If areas of the same size are allocated for the first layer power adjustment area P1 and the second layer power adjustment area P2, the size of the prewrite area PW is uniquely determined.

An area for recording prewrite end address information giving the prewrite end position Qm (the address at which recording in the prewrite area ends) is provided in, for example, the disc management area of the optical disc 100 in compatibility area 112 (FIG. 1). Alternatively, flag information (discrimination information) indicating whether prewriting has been performed may be stored, or both the prewrite end address information and flag information may be stored in the disc management area.

The prewrite end address information or flag information may also be recorded in the recording management area 111.

As described above, according the first embodiment of the invention, because of the restricted areas A1 and A2 in the second recording layer 103, a disc can be provided which, in recording on the second recording layer 103, is not susceptible to lamination misalignment effects or beam diameter effects.

Also, since the disc manufacturer prewrites data in the prewrite area PW, the user's optical disc device does not have to write in the prewrite area, so the optical disc device can quickly start recording data.

Also, as the prewrite end address at the prewrite end position Qm and/or flag information is recorded in the disc management area in the compatibility area 112 on the optical disc 100, the user can easily tell whether or not the prewrite area of the optical disc 100 has already been prewritten, and can easily ascertain the extent and position of the area which can be used for power adjustment.

In the above embodiment, areas of the same size are allocated for the first layer power adjustment area P1 and the second layer power adjustment area P2, but since the prewrite end address is recorded in the disc management area in compatibility area 112 on the optical disc 100, areas of different sizes may be allocated for the first layer power adjustment area P1 and the second layer power adjustment area P2.

Second Embodiment

Figure 5:
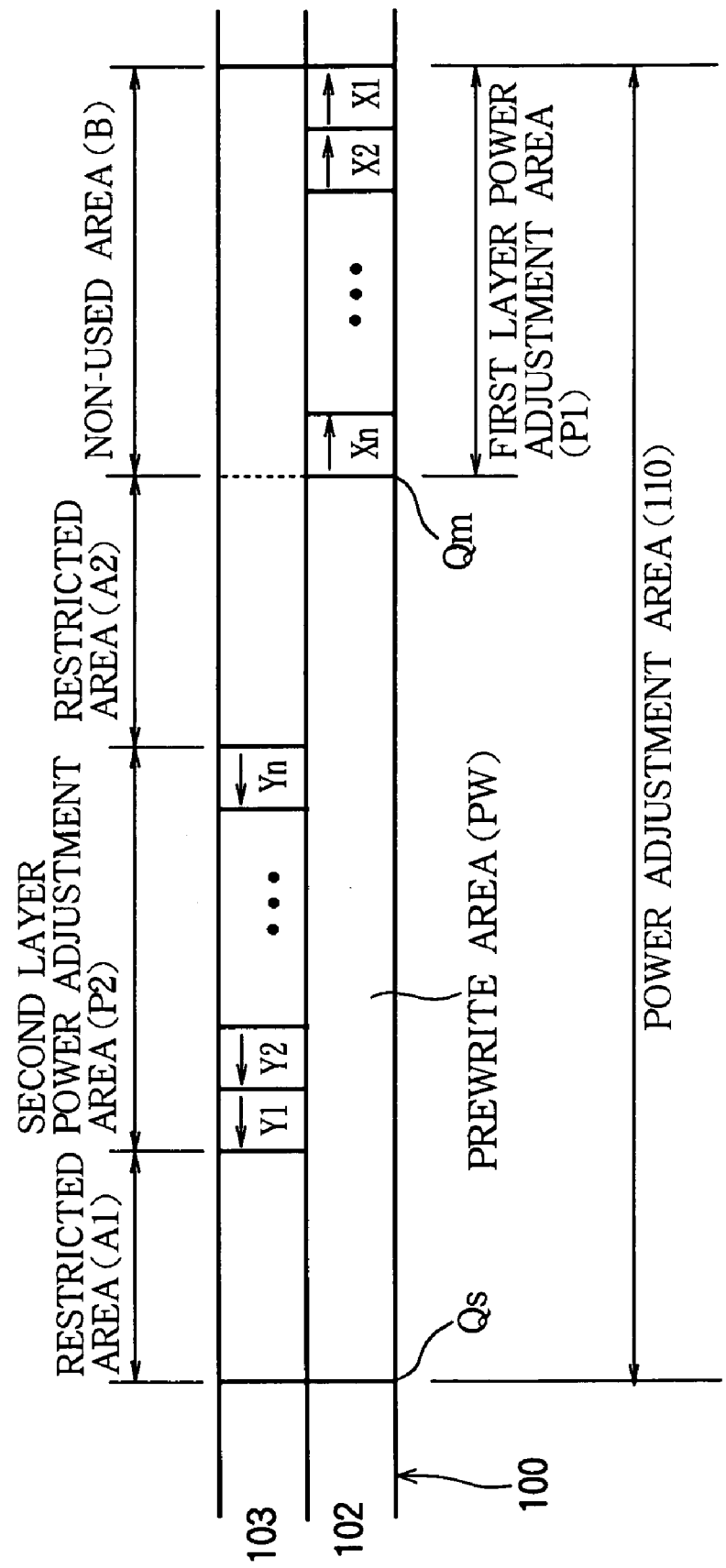
FIG. 5 shows the structure of the power adjustment areas of an optical disc according to a second embodiment.

FIG. 5 shows an example of the structure of the power adjustment area 110 of an optical recording disc according to a second embodiment of the invention. The optical disc 100, first recording layer 102, second recording layer 103 and each area shown in FIG. 5 are similar to the corresponding elements in the first embodiment. In the descriptions of the second to fourth embodiments, only the differences from the first embodiment will be described.

In the first embodiment, the prewrite area PW was prewritten by the disc manufacturer, but in the second embodiment, the prewriting in the prewrite area is performed by the optical disc device.

Therefore, when a user starts using a new optical disc 100, nothing is yet written in the prewrite area PW on the optical disc 100. Even though the manufacturer has not prewritten in the prewrite area PW, however, address information specifying the starting position Qs has been recorded as the prewrite end address in the disc management area in the compatibility area 112 of the optical disc 100. Alternatively, all zeros may be recorded as the prewrite end address, or instead of the prewrite end address, flag information may be recorded indicating whether prewriting has been performed.

Because the prewrite area PW in a new optical disc is blank, the optical disc device has to prewrite in the prewrite area PW before using the second layer power adjustment area P2. Recording in the prewrite area PW is performed from the starting position Qs to the prewrite end position Qm. If areas of the same size are allocated to the first layer power adjustment area P1 and the second layer power adjustment area P2, the prewrite end position Qm is uniquely determined by the width of the restricted areas A1 and A2 and the power adjustment area 110.

An area for recording the address of the prewrite end position Qm is provided in the recording management area 111 of the optical disc. The optical disc device can record the address of the prewrite end position Qm in the recording management area 111 when recording is performed in the prewrite region PW. Also, if the optical disc device has nothing recorded in the prewrite area PW yet when data are recorded in the recording management area 111, the device can record that prewriting on the prewrite area PW has not been performed yet by recording the address of the starting position Qs in the prewrite end address information of the recording management area 111. Alternatively, all zeros may be recorded as the prewrite end address, or instead of the prewrite end address, flag information may be recorded indicating whether prewriting has been performed.

The prewrite end address information and/or flag information can be recorded in the recording management area 111 in either the first layer or the second layer. However, since the recording management area 111 in the second layer is affected by the recording state of the first layer as described with reference to FIGS. 1, 2, 3(a), and 3(b), it is preferable to start recording in the recording management area 111 in the first layer, and proceed to the recording management area 111 in the second layer after the recording management area 111 in the first layer is entirely filled with records. Alternatively, information about the first layer may be recorded in the recording management area 111 in the first layer and information about the second layer may be recorded in the recording management area 111 in the second layer. In this case, the recording management area 111 in the second layer must have restricted areas on both sides, for the same reason as for the second layer power adjustment area P2, so less area can be allocated as the recording management area 111 in the second layer than in the first layer. It is therefore preferable to start recording in the recording management area 111 in the first layer, and proceed to the recording management area 111 in the second layer after the recording management area 111 on the first layer is completely full, even if some of the information recorded in the recording management area 111 in the first layer concerns the second layer.

The structure of the first layer and second layer power adjustment areas P1 and P2 is the same as in the first embodiment except that the writing in the prewrite area PW is left to be performed by the optical disc device.

As described above, according to the second embodiment, as the writing in the prewrite area PW is not performed by the disc manufacturer but by the optical disc device itself, the disc manufacturer can reduce the production time per disc. Also, because of the restricted areas A1 and A2 in the second recording layer 103, a disc can be provided which, in recording on the second recording layer 103, is not susceptible to lamination misalignment effects or beam diameter effects.

Also, as the prewrite end address at the prewrite end position Qm is recorded in the disc management information recording management area 111 in the optical disc 100, the user can easily tell whether or not the prewrite area of the optical disc 100 has already been prewritten, and can easily ascertain the extent and position of the area that can be used for power adjustment.

In the above embodiment, areas of the same size are allocated for the first layer power adjustment area P1 and the second layer power adjustment area P2, but since the prewrite end addresses is recorded in the recording management information 111 on the optical disc 100, areas of different sizes may be allocated for the first layer power adjustment area P1 and the second layer power adjustment area P2.

Third Embodiment

Figure 6:
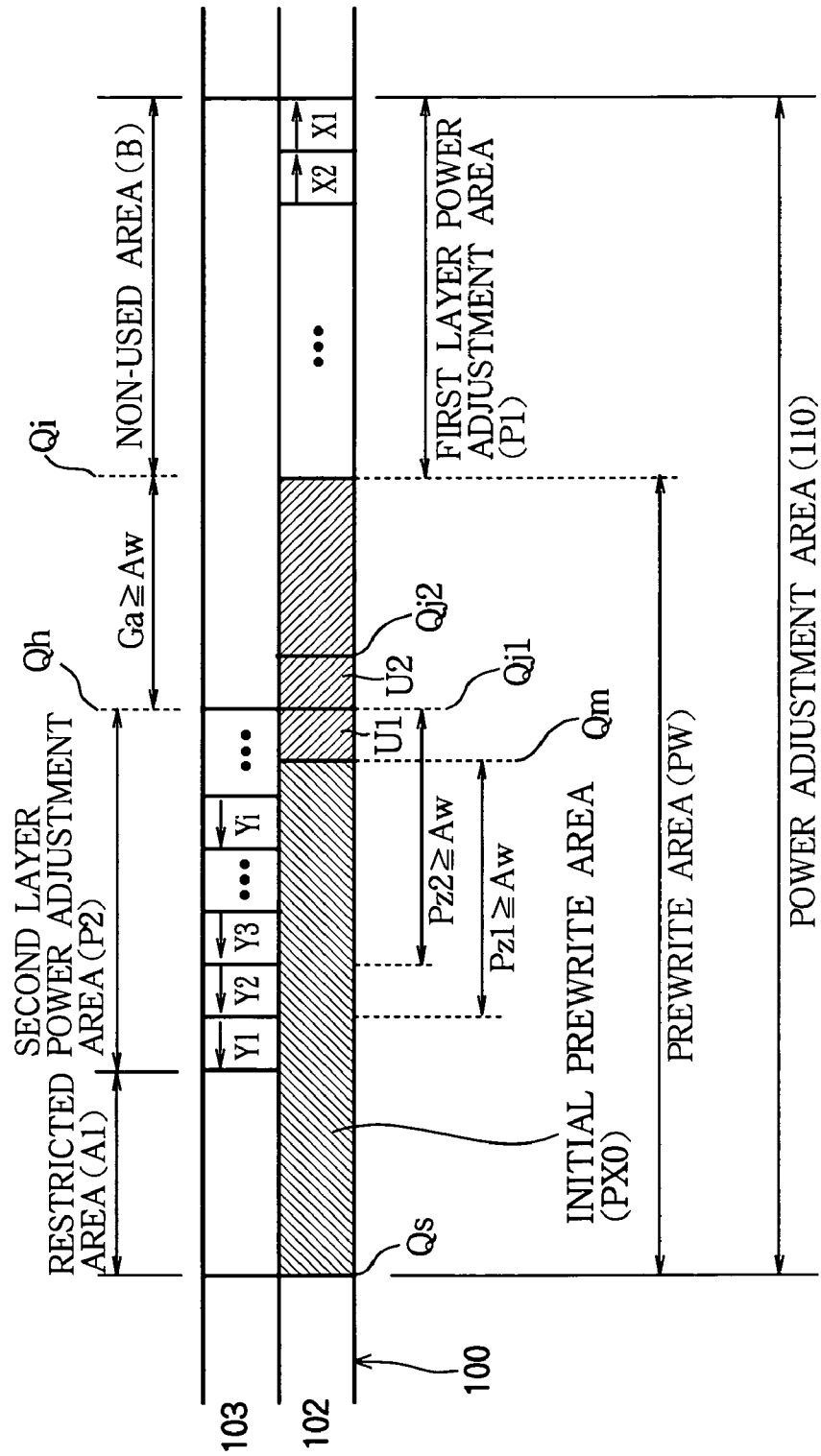
FIG. 6 shows the structure of the power adjustment areas of an optical disc according to a third embodiment.

FIG. 6 shows an example of the structure of the power adjustment area 110 of an optical recording disc according to a third embodiment of the invention.

The optical disc 100, first recording layer 102, second recording layer 103 and each area in FIG. 6 are the same as in FIG. 1. Aw in FIG. 6 indicates the width specified for the restricted area; the positions Qh, Qi, and Qj are not fixed but change with additional power adjustment and writing to the prewrite area PW.

In the first embodiment, the prewrite area PW was entirely prewritten by the disc manufacturer, but in the third embodiment, only part of the prewrite area PW is prewritten by the disc manufacturer, at the optimal recording power. This part will be referred to as the initial prewrite area PX0. The initial prewrite area PX0 embraces a restricted area A1 positioned inside the second layer power adjustment area P2, an area Y1 to be used for the first power adjustment in the second layer power adjustment area P2, and an area Pz1, wider than the restricted area width Aw, extending outward from the outer edge of this area Y1. That is, the width of the initial prewrite area PX0 allows for restricted areas A1 and A2 only around the area Y1 that will be used for the first power adjustment in the second recording layer 103.

The disc manufacturer records the address of the end position Qm of the prewritten area in the recording management area 111 of the optical disc 100, for example.

The order in which power adjustments are performed in the first layer power adjustment area P1 and the second layer power adjustment area P2 and the address information and adjusted power values that are recorded are similar to the order and values in the second embodiment. The sizes of the first layer power adjustment area P1 and second layer power adjustment area P2 are not fixed, however; they can have any size as long as the region Ga between the end position Qi (inner edge) of the first layer power adjustment area P1 and the end position Qh (outer edge) of the second layer power adjustment area P2 has a width not less than the restricted area width Aw.

In this embodiment, before the second power adjustment is performed in the second layer power adjustment area P2, the optical disc device performs additional prewriting in the area U1 from the prewrite end position Qm to a position Qj1 that gives the region Pz2 between the position Qj1 where the additional prewriting ends and the area Y2 that will be used for the second power adjustment a width equal to or greater than the restricted area width Aw. After the additional prewriting, the power adjustment is performed in area Y2 in the second layer power adjustment area P2. The address of the additional recording end position Qj1 is recorded in the recording management area 111 of the optical disc 100 as address information giving the prewrite end position.

Before a third power adjustment is performed in the second layer power adjustment area P2, the optical disc device performs additional prewriting in the area from position Qj1 to a prewrite end position Qj2 that gives the region between position Qj2 and the area Y3 to be used for the third power adjustment a width equal to or greater than the restricted area width Aw. After the additional prewriting, the power adjustment is performed in area Y3 in the second layer power adjustment area P2. The address of the position Qj2 where the additional prewriting ends is recorded in the recording management area 111 of the optical disc 100 as address information giving the prewrite end position.

Similarly, before each subsequent power adjustment is performed in the second layer power adjustment area P2, the optical disc device performs additional prewriting, giving the region between the prewrite end position and the area Yi to be used for the power adjustment a width equal to or greater than the restricted area width Aw, and records the address of the additional recording end position in the recording management area 111 of the optical disc 100 as address information giving the prewrite end position. Additional address information giving the prewrite end position is recorded each time the address value changes, or each time prewriting is performed. In a write-once recordable optical disc the new address information is recorded in addition to old address information, but in a rewritable optical disc the new address information may be overwritten on the old address information.

In this embodiment, additional prewriting is performed in the prewrite area PW at each power adjustment. The additionally prewritten area can have any size as long as the width of the region from the area to be used for the power adjustment to the end of the prewritten area is not less than the restricted area width Aw. In other words, additional recording in the prewrite area PW can be performed in any way provided the length of the prewrite area PW is greater than the length of the region defined as the sum of power adjustment area P2 and the restricted areas A1 and A2 positioned on both sides thereof.

If the part (Pz1) extending from the area Y1 to be used for the first power adjustment to the outer edge of the initial prewrite area PX0 prewritten by the disc manufacturer is shorter than the restricted area width Aw, additional prewriting has to be performed in the prewrite area PW so as to give this region (Pz1) a width equal to or greater than the restricted area width Aw.

As described above, according to the third embodiment, because of the restricted areas in the second recording layer 103, a disc can be provided which is not susceptible, during recording on the second recording layer 103, to lamination misalignment effects or beam diameter effects. Also, as the disc manufacturer prewrites only enough of the prewrite area to provide for the first power adjustment in area Y1 in the second layer, the disc manufacturer can reduce the production time per disc, and as it is only necessary to perform additional prewriting to enlarge the restricted area, the optical disc device can quickly start recording data.

Furthermore, as the end positions of the first and second layer power adjustment areas are not fixed but are limited only by the width of the restricted areas, the power adjustment area can be used freely by the optical disc device.

Also, because the prewrite end address is recorded in the recording management area of the optical disc 100, the user can easily ascertain the extent and position of the prewrite area on the optical disc 100 and the area that can be used for power adjustment.

The area prewritten by the disc manufacturer is not limited to the area corresponding to the first power adjustment in the second layer. An area corresponding to the first several power adjustments can be prewritten by the manufacturer, as long as the above condition is satisfied.

Fourth Embodiment

Figure 7:
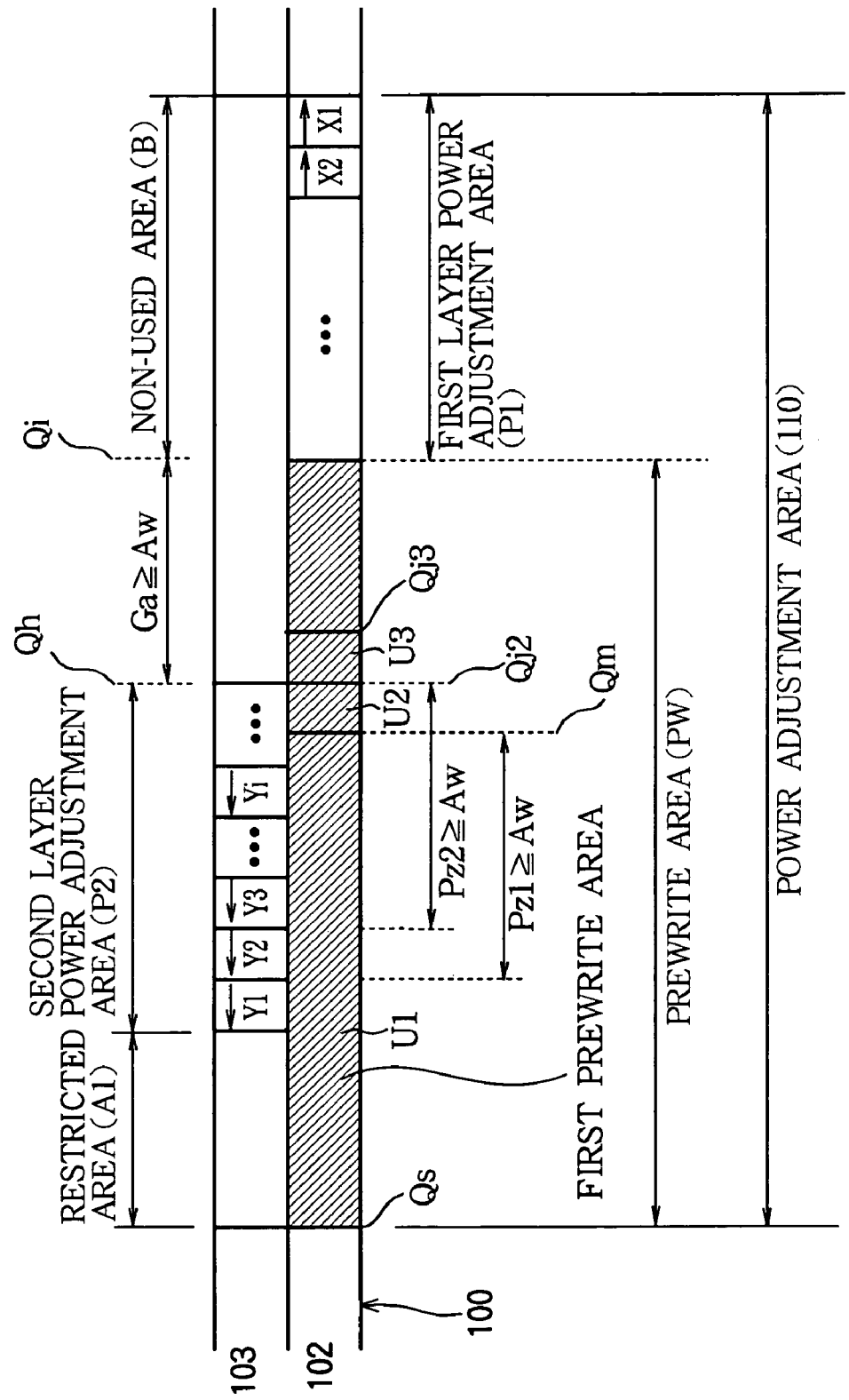
FIG. 7 shows the structure of the power adjustment areas of an optical disc according to a fourth embodiment.

FIG. 7 shows an example of the structure of the power adjustment area 110 of an optical recording disc according to a fourth embodiment of the invention. The structure in FIG. 7 is similar to that shown in FIG. 6 except that the disc manufacturer does not write at all in the prewrite area PW.

In the fourth embodiment, the disc manufacturer records the address of position Qs in the disc management area as the address information giving the prewrite end position. Alternatively, all zeros may be recorded as the information giving the prewrite end address, or instead of the prewrite end address, flag information may be recorded indicating that no prewrite has been performed.

As the prewrite area PW has been left completely blank by the disc manufacturer, the first prewrite area U1 must be prewritten by the user's optical disc device before the first power adjustment is performed in the second layer power adjustment area P2. In the first prewriting, the width of the first prewrite area U1 is defined to give the region Pz1 from the outer end of the first power adjustment area Y1 in the second layer power adjustment area P2 to the prewrite end position Qm a width equal to or greater than the restricted area width Aw. After the prewriting, the address of the prewrite end position Qm is recorded in the recording management area 111 of the optical disc 100 as address information giving the prewrite end position.

After the first prewrite, as further power adjustments are performed in the second layer power adjustment area, additional prewriting is performed in the prewrite area PW as in the third embodiment, to give the region from the area Yi in which the power adjustment will be performed in the second layer power adjustment area to the prewrite end position Qm a width equal to or greater than the restricted area width Aw.

As described in the fourth embodiment, because of the restricted areas in the second recording layer 103, a disc can be provided which is not susceptible to lamination misalignment effects or beam diameter effects during the recording of data on the second recording layer 103. Also, as all writing in the prewrite area PW is performed by the optical disc device instead of by the disc manufacturer, the disc manufacturer can reduce the production time per disc.

Furthermore, as the first prewrite area U1 only corresponds to the area Y1 used for the first power adjustment in the second layer, and further prewriting is performed afterwards as necessary, the optical disc device can start recording quickly.

Furthermore, as the end positions of the power adjustment areas for the first and second layers are not fixed but are limited only by the width of the restricted areas, the optical disc device can make free use of the power adjustment area.

Also, because the prewrite end address is recorded in the recording management area of the optical disc 100, the user can easily ascertain the extent and position of the prewrite area on the optical disc 100 and the area that can be used for power adjustment.

A writable or rewritable optical disc may be used in the first to fourth embodiments above. Although only two recording layers are used in the above embodiments, there may be three layers or more, in which case restricted areas are provided as described above in the layers other than the first layer as viewed from the side on which the recording light is incident, that is, in the second and subsequent layers.

In the first to fourth embodiments above, the second layer power adjustment area is located in the power adjustment area, but the second layer power adjustment area may be located outside the power adjustment area. Even if the second layer power adjustment area is outside the power adjustment area, a prewrite area is provided in the first layer region corresponding to the second layer power adjustment area and the restricted areas.

Fifth Embodiment

Figure 8:
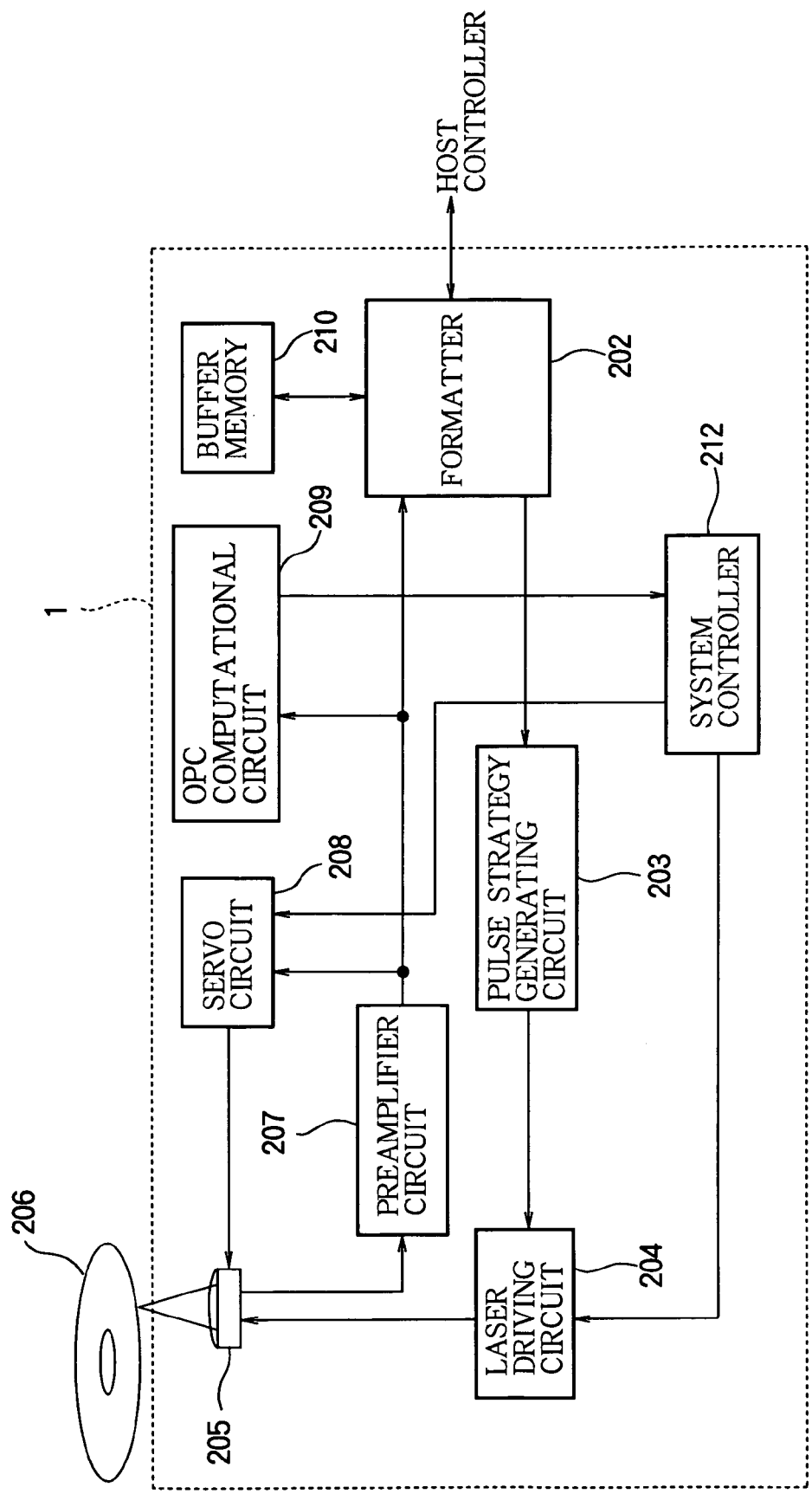
FIG. 8 shows an optical disc device according to a fifth embodiment.

FIG. 8 shows an optical disc device 1 according to a fifth embodiment of the invention. The optical disc device 1 is connected to a host controller (not shown); in the recording of data, for example, a formatter 202 in the optical disc device 1 stores the data received from the host controller into a buffer memory 210, adds error correction codes, modulates the data according to a modulation rule, and arranges the data to be recorded according to the format of the optical disc 206.

Before the arranged data are recorded on the optical disc 206, the data are modulated into a pulse train in a pulse strategy generating circuit 203 so that optimal marks will be formed, and the pulse train is input as a drive signal to a laser driving circuit 204 to record the data on the optical disc 206 via an optical head 205. The optical disc 206 may be any one of the optical discs in the first to fourth embodiments.

Positioning of the optical head 205 is performed as follows.

The signal reproduced by the optical head 205 is amplified in a preamplifier circuit 207 and input to the formatter 202. From the input signal, address information is decoded in the formatter 202 to obtain the current position of the optical head 205. The difference between the address of the position to be accessed and the address of the current position is obtained, and this difference is supplied to the servo circuit 208 to have the servo circuit 208 move the optical head 205 to the position to be accessed.

Before data are recorded in the data area, a trial recording is performed in the power adjustment area 110, the recorded area is reproduced, the reproduced waveform is evaluated in the OPC (optical power control) computational circuit 209, the evaluation result is supplied to a system controller 212, and the system controller 212 controls the laser driving circuit 204 to optimize the recording power.

The above sequence of operations is controlled by the system controller 212 of the optical disc device 1. The control program is stored in a program memory in the system controller 212.

Figure 9:
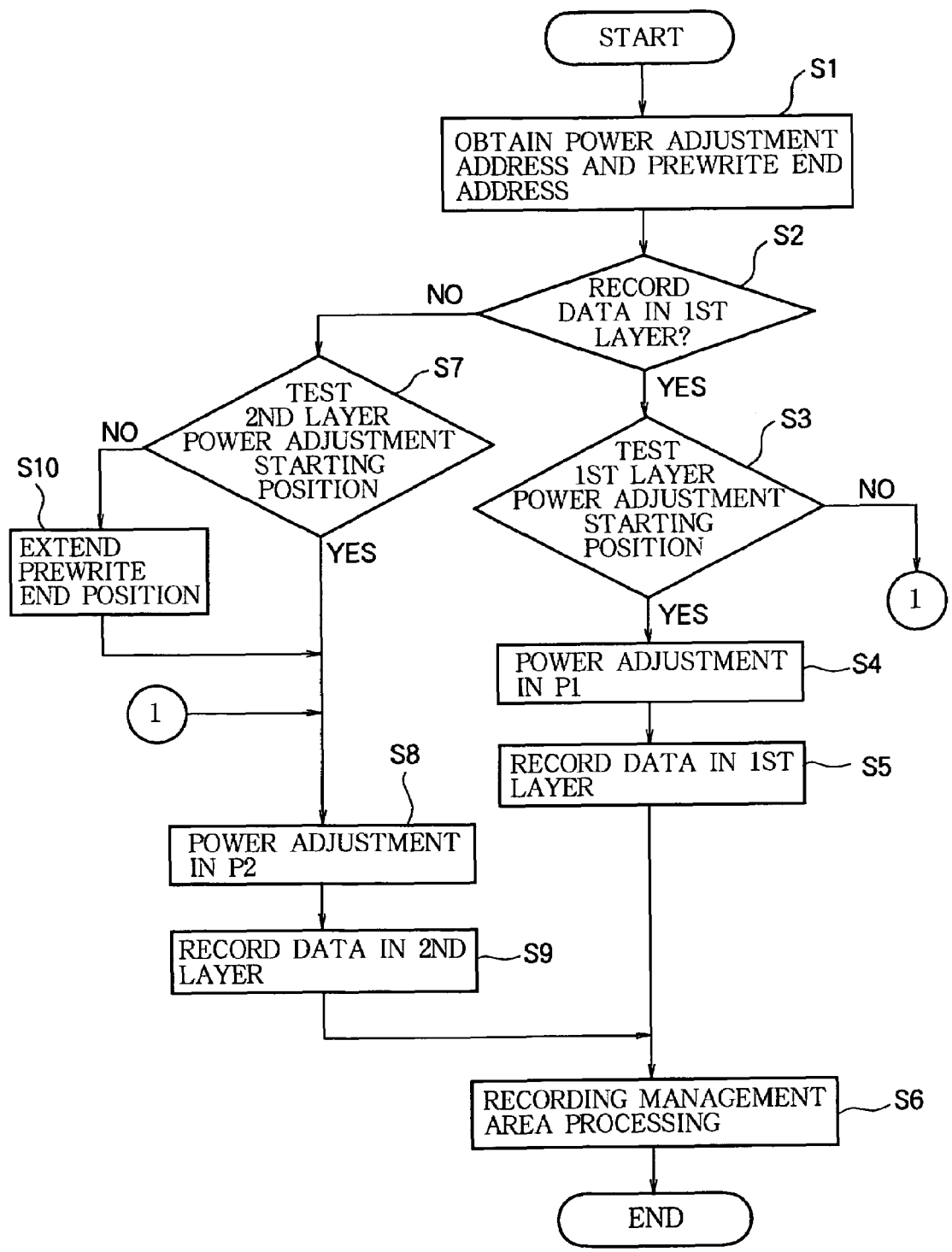
FIG. 9 shows the flow of the power adjustment operations on the recording layers in the fifth embodiment.

The recording operations with a power adjustment operation for each layer in a disc with the one-sided two-layer structure shown in the first to fourth embodiments will be described with reference to the flowchart in FIG. 9. The flow of operations shown in FIG. 9 is applicable to the optical disc in any of the first to fourth embodiments.

First, to obtain the addresses of the power adjustment areas (P1, P2) and the prewrite end address, the optical head 205 is positioned on the disc management area and recording management area, and their data is reproduced (S1) Reproduction of the disc management area data in step S1 yields a prewrite end address, or flag information indicating whether prewriting has been performed, so which of the first to fourth embodiments the optical disc conforms to can easily be recognized.

Next, whether data are now being recorded in the first layer, i.e., whether the second layer is still blank, is determined (S2).

If it is found that the second layer is still blank and the data are now being recorded in the first layer (the result of step S2 is 'Yes'), then whether the position for executing the power adjustment for the first layer lies beyond the prewrite end position toward the outer perimeter of the disc and whether the width of the space between the power adjustment position and the prewrite end position is sufficient for power adjustment is tested (S3). If these conditions are satisfied, a power adjustment is performed in the first layer power adjustment area P1 (S4), and the data are recorded on the first layer (S5). In the recording management area processing (S6) after the data have been recorded, the operation ends without updating of the address information giving the prewrite end position.

If power adjustment is not possible because the position for executing the power adjustment for the first layer and the prewrite end position do not satisfy the above conditions (the result of step S3 is 'No'), recording on the first layer is disabled and a power adjustment is performed in the second layer power adjustment area P2 (S8) to start recording data on the second layer (S9). In the recording management area processing (S6) after the data have been recorded, the operation ends without updating of the address information giving the prewrite end position.

If it is decided in step S2 that the data are to be recorded on the second layer (the result of step S2 is 'No') then whether a power adjustment can be performed in the second layer power adjustment area P2 is determined by determining whether the position for executing the power adjustment for the second layer is inward of the prewrite end position in the radial direction and whether the space between the position for executing the power adjustment for the second layer and the prewrite end position is wider than the width Aw of restricted area A2 (S7). When the above conditions are satisfied i.e., when the power adjustment can be performed, the power adjustment is performed in the second layer power adjustment area P2 (S8), and the data are recorded on the second layer (S9). In the recording management area processing (S6) after the data have been recorded, the operation ends without updating of the address information giving the prewrite end position.

The prewrite end position can be extended up to the position where the power adjustment for the first layer was performed, so if it is determined in step S7 that the power adjustment cannot be performed for the second layer, the prewrite end position is extended (extending the prewritten area) as shown in the second to fourth embodiments (S10). A power adjustment is then performed in the second layer power adjustment area P2 (S8), and data are recorded on the second layer (S9). In the recording management area processing (S6) after the data have been recorded, the operation ends with an update of the address information giving the prewrite end position.

In step S10, the prewrite end position may be extended at once to the position where the power adjustment was performed for the first layer as described in the second embodiment. However, to reduce the time required for extending the prewrite end position, the prewrite end position can be extended as described in the third and fourth embodiments, so that the distance between the position where the power adjustment for the second layer is performed and the prewrite end position is at least equal to the width Aw of restricted area A2.

When whether prewriting has been performed or not is determined from flag information instead of address information indicating the prewrite end position, the flag information, instead of address information, is updated in the recording management process in step S6 in FIG. 9.

The extension of the prewrite end position in step S10 in FIG. 9 is synchronized with recording operations. However, the optical disc device can extend the prewrite end position when an optical disc is inserted into the optical disc device, if the optical disc device determines that prewriting has not been performed for the optical disc or that extension of the prewrite end position is necessary in order to enable recording on the second layer. In this case as well, the prewrite end position may be extended in one stage or in several stages, while the optical disc device is idle.

What is claimed is:

1. An optical disc having at least two layers on which information can be recorded by recording light, one layer being a first recording layer, another layer being a second recording layer disposed behind the first recording layer as viewed by the recording light, wherein:

the first recording layer and the second recording layer have respective power adjustment areas that are used to adjust the power of the recording light to an optimal recording power before recording information on each recording layer; and the first recording layer has, as a prewrite area in a position corresponding to the power adjustment area in the second layer, an area equal to the power adjustment area in the second recording layer plus a restricted area adjacent the power adjustment area in the second recording layer, no information being recorded in the restricted area until recording in the corresponding area in the first recording layer is completed, and the first recording layer or the second recording layer has recording management area in which is recorded information used when information is recorded on the optical disc, address information of a final recorded end of the prewrite area being recorded in the recording management area.

2. A method of recording information on the optical disc of claim 1, comprising:

adjusting the power of the recording light by using the power adjustment areas on the optical disc; and recording the information by using recording light having the adjusted power.

3. An optical disc device for recording information on the optical disc of claim 1, comprising:

means for adjusting the power of the recording light by using the power adjustment areas on the optical disc; and means for recording the information by using recording light having the adjusted power.

* * * * *